(Model.)  
3 Sheets—Sheet 1.

C. M. BANKS.
BUTTON HOLE SEWING MACHINE.

No. 287,217.  Patented Oct. 23, 1883.

WITNESSES:  
S. J. Van Stavoren  
Geo. R. Byington

INVENTOR,  
Chas. M. Banks  
by Connolly Bros.  
ATTORNEYS (Model.) 3 Sheets—Sheet 2.

C. M. BANKS.
BUTTON HOLE SEWING MACHINE.

No. 287,217. Patented Oct. 23, 1883.

WITNESSES:
S. J. Van Stavoren
Geo. R. Byington

INVENTOR,
Chas. M. Banks
by Connolly Bros.
ATTORNEYS.

(Model.) 3 Sheets—Sheet 3.
C. M. BANKS.
BUTTON HOLE SEWING MACHINE.
No. 287,217. Patented Oct. 23, 1883.
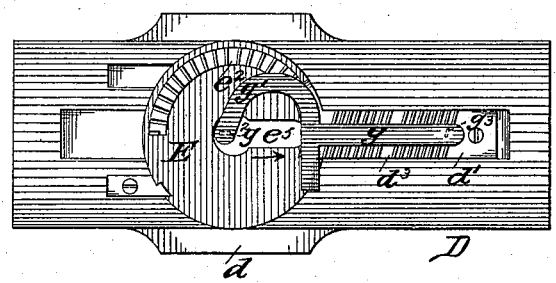
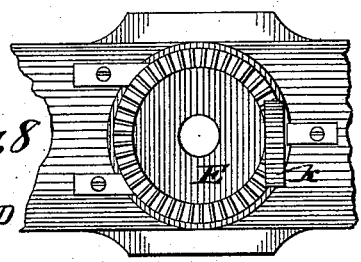
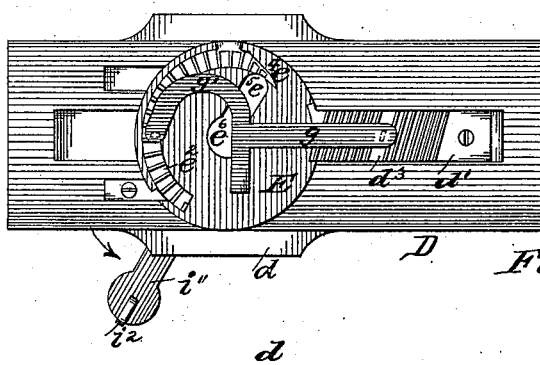
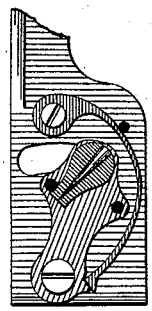
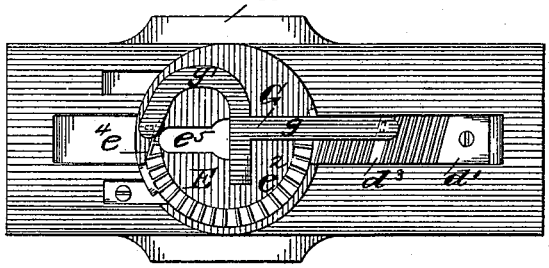
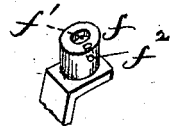
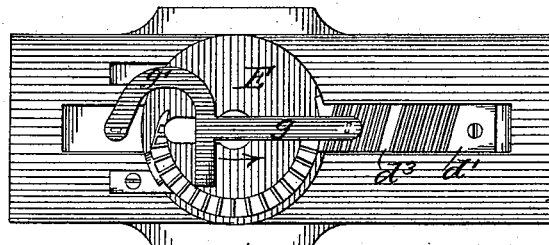
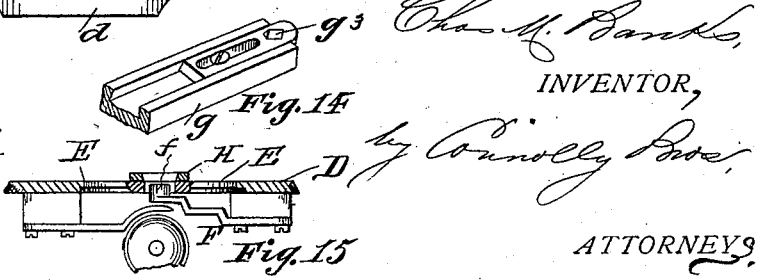
WITNESSES:
INVENTOR,
ATTORNEYS

UNITED STATES PATENT OFFICE.

CHARLES M. BANKS, OF PHILADELPHIA, PA., ASSIGNOR TO THE BANKS BUTTON-HOLE MACHINE COMPANY, (LIMITED,) OF SAME PLACE.

BUTTON-HOLE SEWING-MACHINE.

SPECIFICATION forming part of Letters Patent No. 287,217, dated October 23, 1883.

Application filed May 19, 1881. (Model.)

*To all whom it may concern:*

Be it known that I, CHARLES M. BANKS, a citizen of the United States, residing at Philadelphia, in the county of Philadelphia and State of Pennsylvania, have invented certain new and useful Improvements in Button-Hole Sewing-Machines; and I do hereby declare the following to be a full, clear, and exact description of the invention, reference being had to the accompanying drawings, which form part of this specification, in which—

Figure 1:
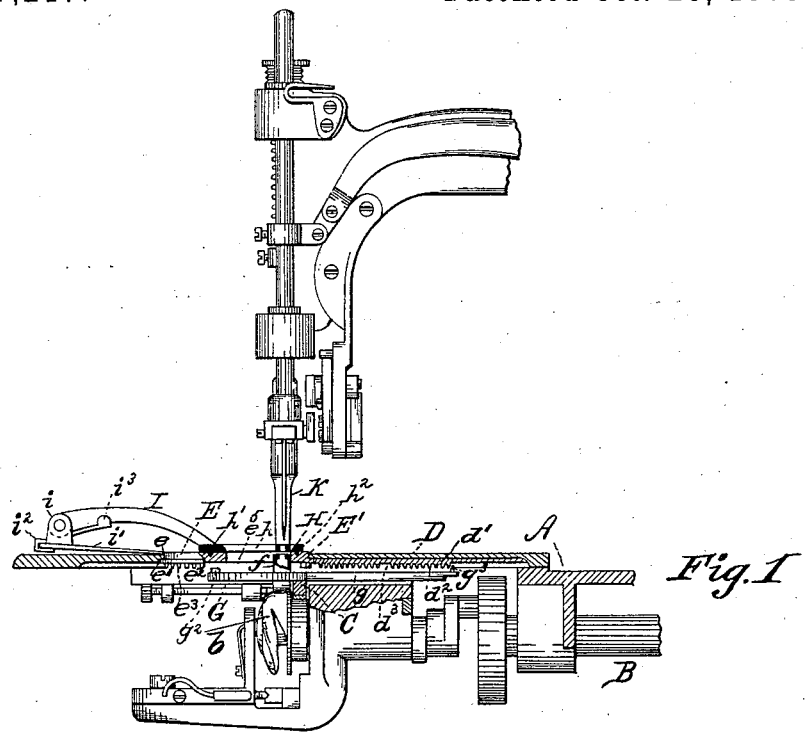
Figure 2:
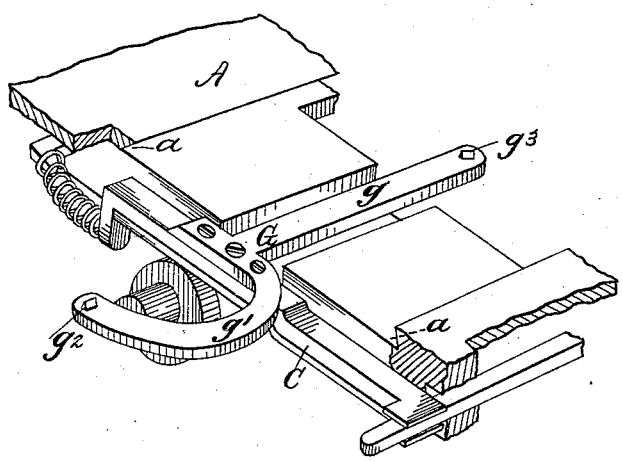
Figure 3:
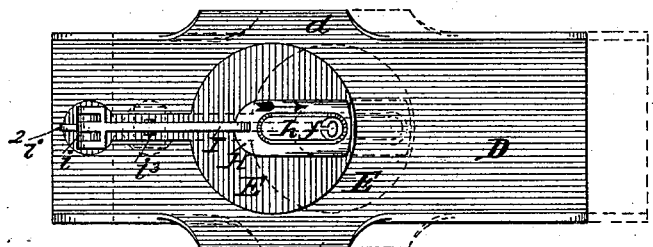
Figure 7:
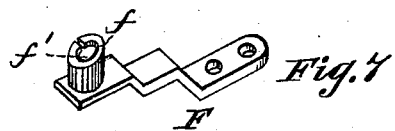
Figure 4:
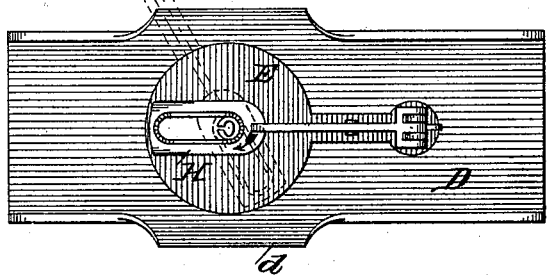
Figure 5:
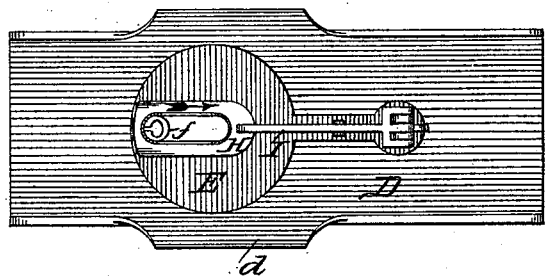
Figure 6:
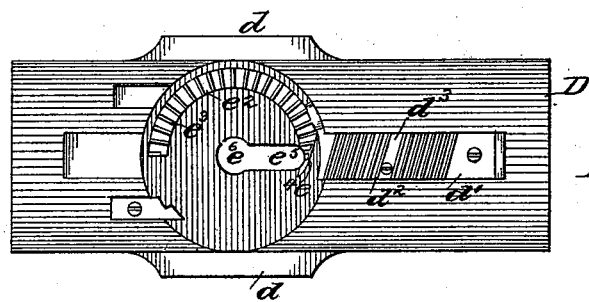

Figure 1 is an elevation, partly in section, of a portion of a sewing-machine with my improvements shown as applied thereto. Fig. 2 is a detail perspective of the feed-dog and operating mechanism therefor. Figs. 3, 4, and 5 are plans of my improved attachment, illustrating the three positions it assumes during the operation of stitching a button-hole. Fig. 6 is an inverted plan of the same. Fig. 7 is a detail perspective of the throat-plate. Figs. 8, 9, 10, and 11 are inverted plans of the attachment and feeding-dog, showing the various positions of said parts in relation to each other during the operation of stitching a button-hole. Fig. 12 is an elevation of the device for alternating the line of descent of the needle. Fig. 13 is an inverted plan of the modification of my invention to be used in stitching eyelets, and Figs. 14, 15, and 16 are detail views.

My invention has for its object to provide simple and efficacious means whereby cloth or other fabric or material in which button-holes are being stitched may be moved in such manner as to cause the stitching to follow the edge of such button-holes.

My improvements consist in the peculiar construction and combination of parts hereinafter fully set forth, having reference principally to the following points: first, to the provision of a feed-plate provided with a rotary disk, said plate being designed and adapted to be moved longitudinally, and said disk being adapted to be rotated, as hereinafter fully set forth; second, to the combination, with a sliding feed-plate having a rotary disk, of mechanism whereby motion is alternately communicated to said parts, said mechanism consisting of a feed-dog which engages with racks on the under side of said plate and disk, as hereinafter fully set forth; third, to the combination, with a sliding feed-plate having a rotary disk, of a cloth-holder for securing the fabric or other material in which the button-hole is to be worked while being stitched, said cloth-holder being secured to the rotary disk, so as to partake of the movements of the latter; fourth, to certain details of construction and combination of parts as hereinafter fully set forth.

Referring to the accompanying drawings, A designates the cloth-plate of an ordinary sewing-machine, underneath which is located the main shaft B, which carries the hook $b$, in which is placed a bobbin or other equivalent device, whereby the loop may be interlocked for the formation of the stitch. As my improvements are not confined to any particular machine, I do not deem a specific description of the bobbin-hook or its appendages necessary.

C designates the bar which, in feed mechanisms, constitutes or serves as the medium for feeding the fabric in the direction of the seam, such bar being usually formed or provided with teeth or serrations to grasp or bite the cloth. For the purposes of my invention I dispense with the teeth or serrations and utilize said bar for the purpose of imparting motion to a feed-plate using such appurtenances or intermediate mechanism as will convert the ordinary motions of the feed-bar into a movement of the feed-plate corresponding to the form of the button-hole and tracing the outline thereof. Such mechanism I will now describe.

The feed-plate is shown at D, and consists of a narrow strip or plate of metal adapted to occupy and slide or travel in a slot or recess, $a$, of the cloth-plate, running transverse of the feed-bar, or in the direction of the axis of the main shaft. The plate D is formed or provided with wings, flanges, or guides $d$.

E designates a circular disk, occupying a corresponding opening, E', in the plate D, and having its edge lipped or rabbeted, as shown at $e$, so as to lie in and turn upon the correspondingly rabbeted or chamfered portion $e'$ of the opening E', as shown. The under side of the feed-plate is provided with a rack, $d'$, the teeth or ridges $d^2$ of which lie obliquely, as shown, and are in two series separated by a space or interval, $d^3$, for a purpose which will be explained. The under side of the plate or disk E is also formed or provided with a rack, $e^2$, which is of segmental form, with radial teeth or ridges $e^3$, and occupies about one-half the circle of the disk. This rack terminates at one end in a ridge, $e^4$, lying at such an angle that when the said disk is turned half-way around in stitching a button-hole said ridge shall be parallel with the oblique ridges or teeth of the rack $d'$. The disk E has in or through it the opening or slot $e^5$, corresponding with the shape of the button-hole, and designed to circumscribe or embrace the edges of the same. This opening is of the shape usually adopted for like purposes in button-hole-stitching machines, being in the form of an oblong slot terminating at one end in an enlarged circular space, $e^6$. In the present instance the space $e^6$ is in the center of the disk, while the elongated part of the slot is radial.

F designates the throat-plate, which is provided with a stud, $f$, having an opening, $f'$, for the play of the needle. It is secured by screws to the machine bed-plate on a line with the feed-bar and adjacent thereto, as shown in Fig. 15. The object of this stud is to afford a support to the fabric being stitched, and to prevent such fabric from being forced down into the throat-slot on the descent of the needle. Attached to the upper surface of the feed-bar is a dog, G, consisting of a straight shank, $g$, and a curved arm, $g'$, the latter being shaped so as to terminate forward of the center of the plate E, while including the throat-plate stud $f$ and avoiding the opening $e^5$. At either end of said dog is fixed a tooth, $g^2$ $g^3$, rising from the upper surface, so as to be available for engagement with the respective segmental and straight racks.

H designates a holding-plate for the purpose of securing the cloth in place upon the disk E. This plate is formed with an elongated opening or slot, $h$, the edges of which embrace those of the button-hole opening $e^5$. Pins $h'$ $h^2$, projecting from the under side of said holding-plate, enter holes in the disk E, and when the cloth is in position and underneath said plate these pins pass through the fabric and keep it in exactly proper relation to the needle. The plate H is provided with a curved arm, I, pivoted at its outer extremity to a standard, $i$, secured to an arm, $i'$, projecting or extending from the disk, in line with and directly opposite the button-hole slot $e^5$. A spring, $i^2$, attached to the arm $i'$, as shown, and formed with a stirrup, $i^3$, bears against the under side of the arm I, so as to lift and support said arm and holding-plate when the latter is released from pressure on the cloth. The presser-foot is shown at K. When lowered, the heel of the foot rests on the cloth-holder, pressing it down in order to retain the goods in place. The toe or front of the presser-foot is slotted corresponding with the slot in the throat-plate, and holds the goods while drawing up the stitch. The needle is designed to have a reciprocating movement, as in button-hole machines generally— that is, it alternately descends in two different lines, so as to produce the required overseaming stitch. The mechanism for imparting this movement to the needle may be of any suitable character. In the drawings I have shown devices for this purpose of the character illustrated in Letters Patent No. 246,450, dated August 30, 1881.

The operation is as follows: The normal position of the plate D is that shown in Figs. 1 and 3, so that the stud of the throat-plate occupies the inner extremity of the slot $e^5$, the latter being parallel with the sides or central line of the plate. The cloth being inserted beneath the holding-plate, with the button-hole slit occupying the center of the slot $e^5$, and the presser-foot being depressed, the position of the dog G is such that the tooth $g^3$ lies just at the outer end of and below the rack $d'$. By reason of the position of the feed-bar, which is just as when about to rise and travel lengthwise as in feeding, the tooth $g^3$ is at one side of the rack. Now, the machine being started, the feed-bar rises, throwing the tooth $g^3$ into engagement with the first tooth or ridge of the rack, as shown in Fig. 8. The feed-bar then makes its forward movement and the tooth $g^3$ moves correspondingly. It impinges against and bears upon the rack tooth or ridge and so effects a longitudinal movement of the plate D to the right. The dog G now falls and recedes in correspondence with the next movement of the feed-bar to begin its next rise and fall, while the feed-plate D remains stationary. During the interval the needle descends and a stitch is formed in the usual way. The operation is then repeated, the needle alternating in the line of its descent, as before suggested, and the tooth $g^3$ taking successively the different teeth of the rack until the space $d^3$ is reached, which occurs when one side of the button-hole has been stitched. By this time the segmental rack has been brought over the tooth $g^2$, as shown in Fig. 9, so that the movement of the feed-bar shall bring said tooth into engagement with said rack, and by causing the tooth $g^2$ to impinge upon the teeth of the rack successively effect a rotary movement of the disk, and with it the fabric held thereon. This rotation occurs when the end of the button-hole is reached, and the purpose of it is to produce the stitching around the eye or circular enlargement of the button-hole. Under the rotation the disk describes a half-circle, by which the position of the elongated button-hole slot $e^5$ is reversed, as shown in Fig. 4. The tooth $g^2$ now comes in contact with the ridge $e^4$, as shown in Fig. 10, and, pressing against the same, moves the plate D back, so that at the next movement of the feed-bar the tooth $g^3$ will re-engage with the straight rack. The operation of the machine being continued, the feed-plate D again travels lengthwise step by step, and the stitching goes on as before; but as the button-hole plate and fabric have been reversed the direction of the stitching is toward the starting-point of the button-hole, and is on the opposite edge from where it began. Thus it will be seen both edges and the eye of the button-hole are stitched in one continuous operation without the necessity of making any change or doing other than operating the machine as in ordinary straight-line stitching. The cloth may be now removed and the parts restored to their normal position by first drawing the feed-plate to the left until tooth $g^2$ coincides with the edge of the disk, then reversely rotating the latter to reverse the position of the button-hole slot, and finally drawing plate D to the left until the throat-plate stud $f$ is at the end of the button-hole slot.

For the purpose of stitching eyelets the modification shown in Fig. 13 may be employed. It consists of a disk having a circular opening in the center and an annular rack on the under side. This disk is used with a stationary cloth-plate, and when impelled by the dog describes a complete circle. The dog used with the eyelet-disk should consist of the sectional piece $k$, the shank being dispensed with. To accommodate button-holes of different length, the rack $d'$ may be made detachable, so that various lengths of racks may be employed. The tooth $g^3$ should be adjustable, as shown in Fig. 14, to conform in position to the length of rack.

It will be observed that the mechanism for effecting the requisite travel or feed of the fabric for button-hole-stitching purposes comprises but very few devices, and is therefore very simple, comparatively inexpensive, and not likely to get out of order. It may be applied to sewing-machines of the ordinary character without permanently changing the working parts of the same or in any way unfitting them for use in ordinary sewing.

To provide for cording a button-hole, the stud $f$ may be formed with an oblique aperture, $f^2$, Fig. 16, through which a cord taken from a spool located in any convenient position beneath the cloth-plate passes. The reciprocating movement of the needle carries the thread of the latter over the cord and secures or stitches the latter to the edge of the button-hole. By this means I am enabled to take the cord from the under side of the cloth-plate, which is more convenient and secures a more perfect stitch than where such cord is taken from above the cloth-plate.

What I claim as my invention is as follows:

1. The combination of a sliding feed-plate, D, and a rotating disk, E, provided with racks $d'$ and $e^2$, respectively, on their under sides, with the feed-bar of a sewing-machine and intermediate mechanism between said bar and the plate and disk, whereby the motion of said feed-bar slides the plate, rotates the disk, and again slides the plate, continuously, substantially as set forth.

2. In button-hole attachments for sewing-machines, the combination of a bed-plate having guides, with a sliding plate fitted therein, and carrying a disk, said plate and disk having, respectively, a straight and a segmental rack on their under sides, whereby said plate is adapted to be moved lengthwise, said disk rotated, and said plate again moved lengthwise in the same direction, said plate remaining stationary while the disk is rotated, substantially as described.

3. A cloth-feeding device for button-hole sewing, comprising a sliding plate carrying a rotary disk, said plate and disk having, respectively, on their under sides a straight and a segmental rack, and being adapted and designed for use in connection with the four-motion feed-bar of a sewing-machine, substantially as shown and described.

4. The combination, with the sliding feed-plate D, having a mutilated rack on its under side, of the button-hole disk E, having a segmental rack on its under side, and the dog G, substantially as set forth.

5. The combination, with the feed-plate D, having a mutilated rack, $d'$, on its under side, with oblique teeth or ridges, of the rotary button-hole plate E, having on its under side the segmental rack $e^2$, with radial teeth, and the tangential ridge $e^4$, substantially as shown and described.

6. The combination, with feed-plate D, of detachable rack $d'$, substantially as set forth.

7. In an organized sewing-machine, the combination of the following parts, viz: a feed-plate adapted and designed to be moved longitudinally, and carrying a rotary or swiveled disk, a holder for securing the cloth to be operated upon on said disk, means, substantially as described, for sliding said feed-plate rectilineally without rotating the disk, and for rotating the disk while the feed-plate is at rest, with a needle-carrier and means for reciprocating the same vertically and laterally to form a zigzag stitch, whereby the fabric to be operated upon is secured beneath a holder, and while so held is first moved in a straight line while one side of the button-hole is being stitched, then rotated while the eye is being formed, and then moved straight again while the other side of the hole is being stitched, substantially as shown and described.

8. The dog G, provided with the adjustable tooth $g^3$, as and for the purpose described.

In testimony that I claim the foregoing I have hereunto set my hand this 5th day of May, 1881.

CHARLES M. BANKS.

Witnesses:
JOHN W. STEWARD,
S. J. VAN STAVOREN.